May 2, 1933.  J. A. HELLER  1,906,928
DISPENSING APPARATUS
Filed March 23, 1931   6 Sheets-Sheet 1

Inventor
John A. Heller
By
F. K. Bryant
Attorney

May 2, 1933. J. A. HELLER 1,906,928
DISPENSING APPARATUS
Filed March 23, 1931 6 Sheets-Sheet 2

Inventor
John A. Heller.
By J. C. Bryant
Attorney

May 2, 1933.  J. A. HELLER  1,906,928
DISPENSING APPARATUS
Filed March 23, 1931    6 Sheets-Sheet 3

Inventor
John A. Heller
By
Attorney

May 2, 1933.    J. A. HELLER    1,906,928
DISPENSING APPARATUS
Filed March 23, 1931    6 Sheets-Sheet 5

Inventor
John A. Heller.
by
Attorney

May 2, 1933.                J. A. HELLER                1,906,928
                        DISPENSING APPARATUS
                    Filed March 23, 1931      6 Sheets-Sheet 6

Inventor
John A. Heller
By
          Attorney Patented May 2, 1933

1,906,928

UNITED STATES PATENT OFFICE

JOHN A. HELLER, OF CARTHAGE, MISSOURI

DISPENSING APPARATUS

Application filed March 23, 1931. Serial No. 524,725.

This invention relates to certain new and useful improvements in dispensing apparatus.

The primary object of the invention is to provide an improved dispensing apparatus especially designed for the dispensing of bottled beverages, the apparatus being coin controlled in operation and such coin controlled mechanism is described and claimed in co-pending application filed by John A. Heller.

A further object of the invention is to provide dispensing apparatus for bottled beverages wherein one or a plurality of drums rotatably mounted within a refrigerant casing with operating devices for each drum adapted to rotate the same in a step by step movement for the discharge or delivery of a bottle from the refrigerant casing at each cycle of operation.

A further object of the invention is to provide dispensing apparatus of the foregoing character wherein devices associated with the rotatable drum effect rotation of the drum in a step by step movement with the drum restrained from rotating movement during operation of the bottle ejecting mechanism.

Still a further object of the invention is to provide drum rotating and movement restraining means of the foregoing character wherein the movement restraining means is shifted to inoperative position by the drum rotating means during initial movement of the latter with the drum restraining means again becoming effective at the end of movement of the drum rotating means.

With the above and other objects in view that will become apparent as the nature of the invention is better understood, the same consists in the novel form, combination and arrangement of parts hereinafter more fully described, shown in the accompanying drawings and claimed.

Figure 1:
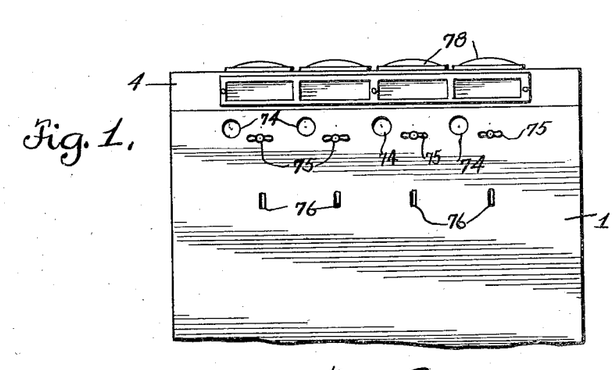
Figure 1 is a fragmentary front elevational view of the dispensing apparatus constructed in accordance with the present invention, showing a coin slot and handle for each bottle conveying drum within the casing and a name plate for the character of beverage carried by each drum.
Figure 2:
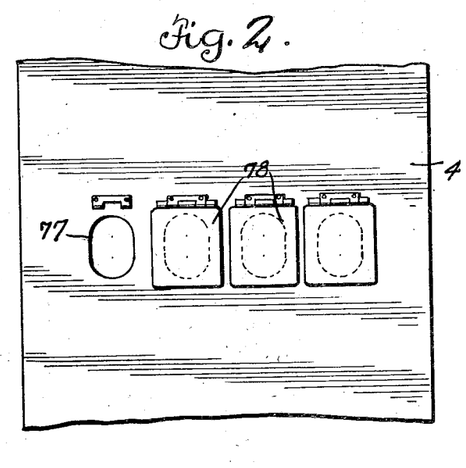
Figure 2 is a fragmentary top plan view showing the hinged covers overlying the bottle delivery opening with one of the covers removed to show the opening.
Figure 3:
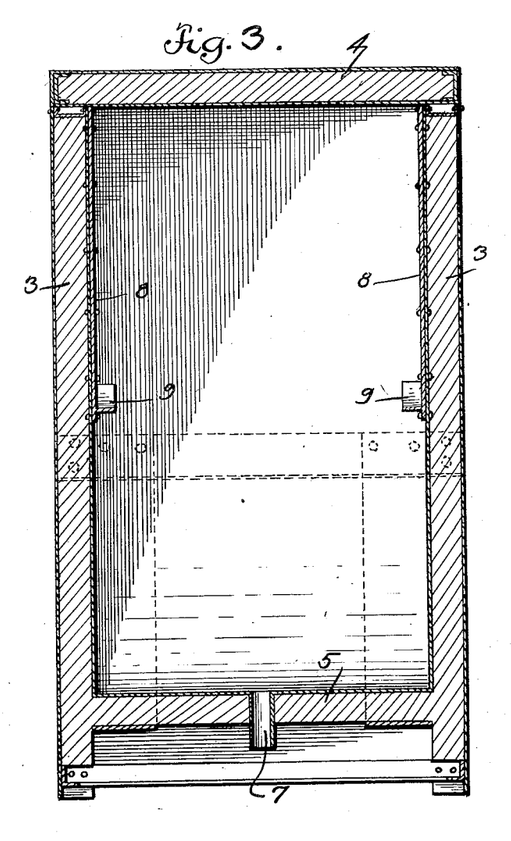
Figure 3 is a vertical longitudinal sectional view of the cabinet or casing of the apparatus with the interior mechanism removed and illustrating the hanger brackets for the bottle conveying drums and the insulated wall construction.
Figure 13:
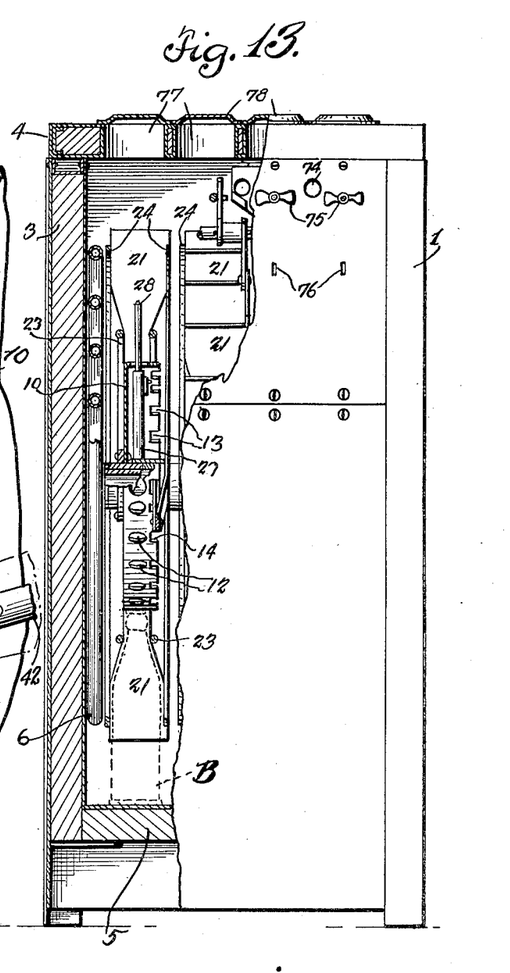
Figure 13 is an end elevational view of the bottle dispensing casing, partly broken away to show a plurality of bottle containing drums therein.

Referring more in detail to the accompanying drawings, there is illustrated a bottled beverage dispensing apparatus, although it is to be understood that the same may be employed for the dispensing of other articles such as cans, boxes or the like, the apparatus comprising, as illustrated in Figures 1 to 3, 6, and 13, a cabinet or casing of any appropriate design, the same comprising a front wall 1, a rear wall 2, side walls 3, a top wall 4 and a curved bottom wall 5, set upwardly from the bottom ends of the front, rear and side walls as illustrated, all of said walls being of the shell type with insulating material embodied therein as it is intended to include refrigerating mechanism in the casing, the refrigerant coils 6 of which are shown in Figure 13, the curved bottom wall 5 being provided with a drain spout 7 shown in Figure 3.

Figures 4, 5:
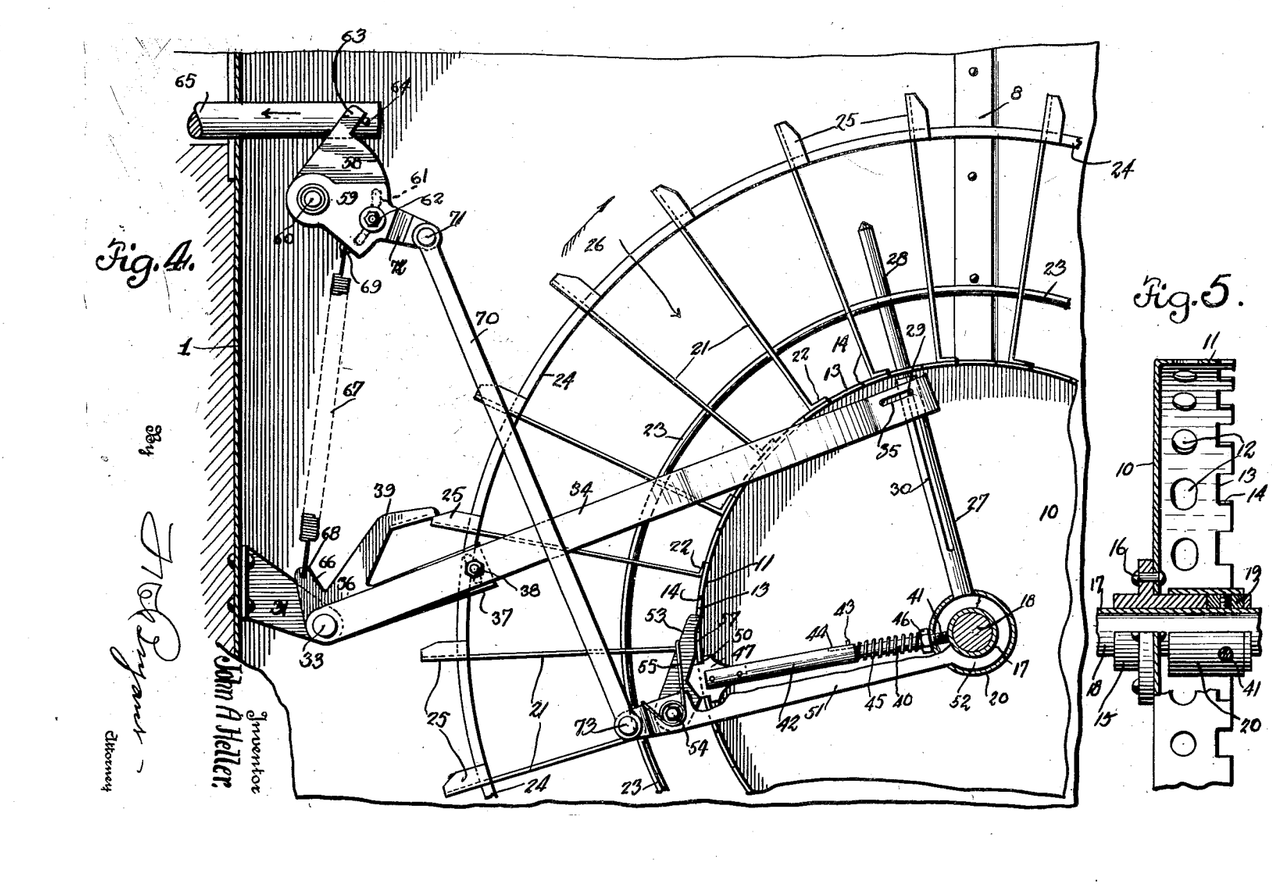
Figure 4 is a fragmentary elevational view, partly in section, showing a part of the bottle conveying drum and the operating mechanism associated therewith in normal position, the drum locking device being engaged with the drum, the bottle ejecting plunger being extended into one of the pockets of the drum and a cam member on the drum engaged with an arm controlling operation of the bottle ejecting plunger.
Figure 5 is a fragmentary detail sectional view of the drum showing spaced openings therein for the passage of the bottle ejecting plunger and the edge notches with which the drum rotating dog is engageable.
Figure 6:
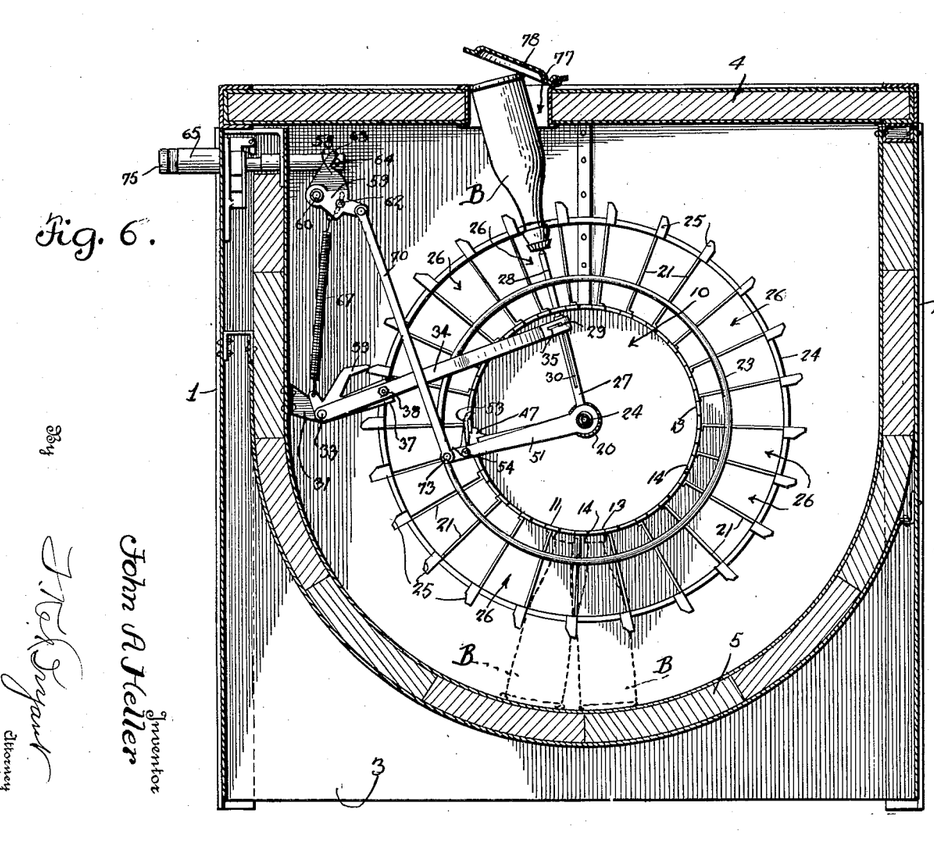
Figure 6 is a vertical cross-sectional view of the dispensing casing showing a bottle ejected through the delivery opening by the plunger with the bottle retained in position in the pocket of the rotatable drum by a coincidently curved wall of the casing.
Figure 7:
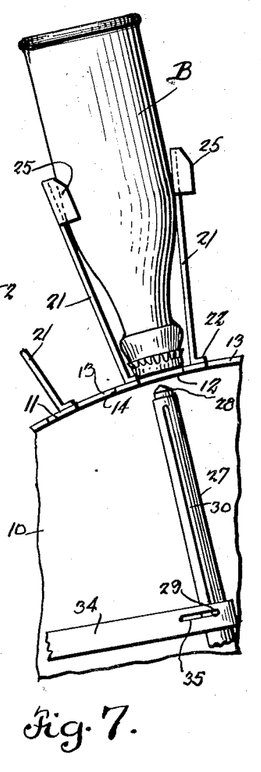
Figure 7 is a fragmentary detail view showing a bottle in position in a pocket of the drum with the bottle ejecting plunger retracted.

A plurality of bottle conveying rotatable drums are mounted in the casing in concentric relation to the curved bottom wall 5 thereof as illustrated in Figures 6 and 13, one of the drums being shown in detail in Figure 5, the mounting for the drums including hangers 8 secured to the inner faces of the side walls 3 as shown in Figure 3, with bearing supports 9 at their lower ends. The drum, as shown in Figure 5 includes a disk wall 10 carrying an annular flange 11 extending laterally from the peripheral edge of the disk wall with spaced slotted openings 12 in the flange, while the free edge of said flange is provided with equi-distantly spaced notches 13 defining edge walls 14 for purposes presently to appear. The disk wall 10 is axially secured to a bearing 15 as at 16 and said bearing 15 is rotatably mounted upon a sleeve 17 fixed to the shaft 18, the ends of the shaft 18 and sleeve 17 that is fixed thereto being rotatably supported in the hanger bearings 9. At the open side of the drum as shown in Figure 5, a collar 19 is fixed to the sleeve 17 and the band 20 fixed to the collar 19 for purposes presently to appear, also overlies the adjacent end of the bearing 15 for retaining the drum in position on the shaft 18.

Figure 9:
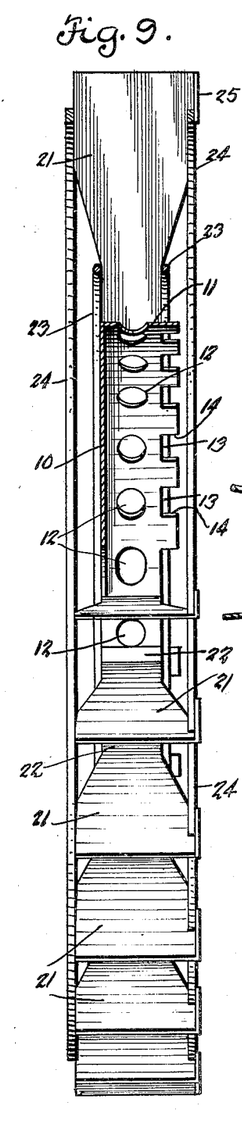
Figure 9 is an edge elevational view, partly in section of a rotatable bottle conveying drum.
Figure 10:
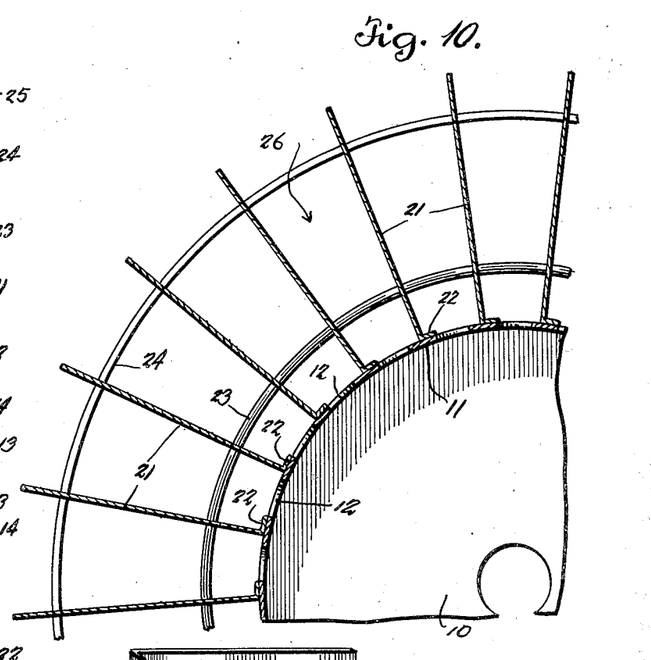
Figure 10 is a detail sectional view of a part of the drum showing the spaced walls carried by the periphery of the drum forming bottle compartments.
Figure 11:
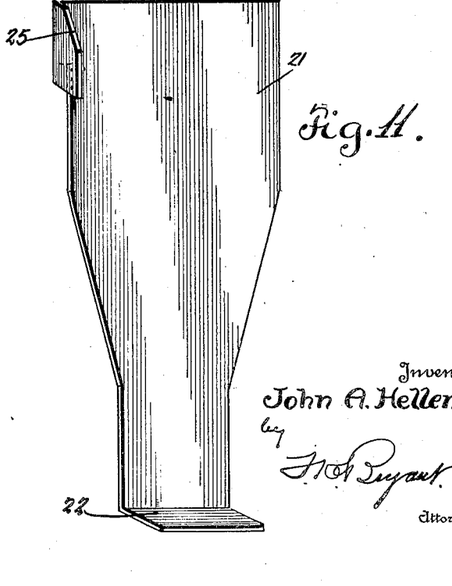
Figure 11 is a perspective view of one of the spaced walls of the bottle compartment showing the cam lug thereon for operating the bottle ejecting plunger.

The bottle conveying devices forming a part of the rotatable drum are shown in detail in Figures 9 to 11 and include spaced blade-like arms 21 secured to the annular flange 11 in spaced relation by angle portions 22 at their inner ends that may be secured in position as by welding, riveting or the like, the radially extending arms 21 being retained in relatively immovable position by the ring members 23 and 24 positioned at different radial distances relative to the axis of the drum and longitudinally of the arms as illustrated in several of the figures, the outer end of each arm outwardly of the outer retaining ring 24 carrying an angularly directed cam lug 25. The arms 21 terminate in spaced relation to the bottom curved wall 5 of the casing and travel in a path concentric with the bottom wall and are of a length whereby a bottle B confined in a pocket 26 between the arms will be moved over the curved bottom as will be at once understood from an inspection of Figures 6 and 13.

Devices are provided for locking or restraining the drums from rotation, ejecting a bottle from one of the pockets 26 and for rotating the drums, the bottle ejecting means comprising a tubular shaft 27 secured at its inner end to the band 20 that is anchored against rotation, the tubular shaft 27 extending radially of the drum and with which shaft the openings 12 in the flange 11 of the drum are brought into registry. A plunger rod 28 slidably mounted in the tubular shaft 27 carries a side pin 29 adjacent its inner end and is slidable through a longitudinal slot 30 in the tubular shaft. The operating means for the plunger rod are shown more clearly in Figures 4, 6 and 8 and include a bracket 31 secured as at 32 to the front wall 1 of the casing, the bracket 31 having a pin 33 journalled therein upon one end of which a relatively long lever 34 is secured. The other end of the lever 34 being slotted as at 35 to take the pin 29 of the plunger rod 28. A lever plate 36 fixed to the pin 33 includes an arm 37 having an adjustable connection 38 with the lever 34 permitting adjustment of said lever and said plate 36 carries an offset cam arm 39 for cooperation with the cam lug 25 upon the arms 21 in a manner presently to be described.

Figure 8:
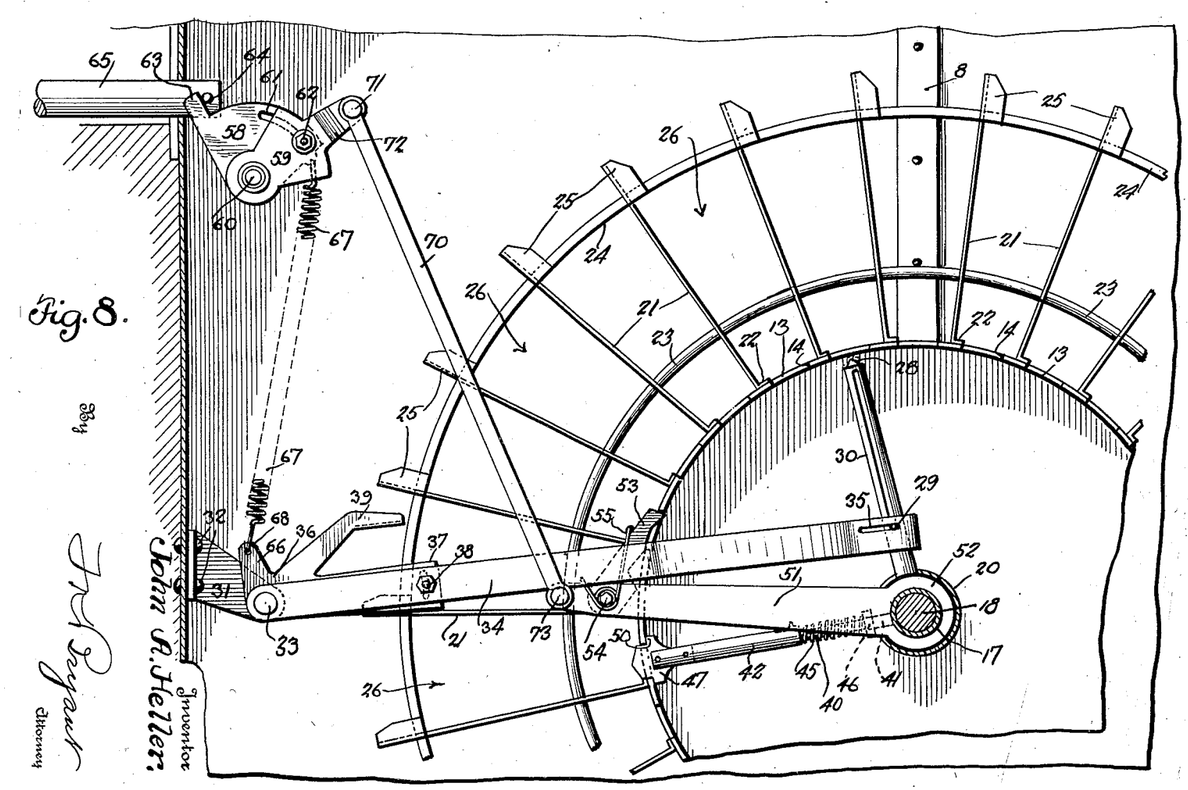
Figure 8 is a fragmentary elevational view, partly in section similar to Figure 4, showing the plunger rod retracted from an opening in the rotatable drum to permit rotation of the latter by the drum rotating dog.

The devices for restraining or locking the device from rotation include a rod 40 having threaded engagement 41 with the band 20 and collar 19, the outer end of the rod telescoping in a tubular shaft 42, the latter being prevented from rotation on the rod by the pin 43 carried by the latter and working in a side slot 44 in the tubular shaft 42. The rod 40 is surrounded by a coil spring 45 between a retaining nut 46 on the inner threaded end thereof and the inner end of the tubular shaft 42 for normally retaining the latter at its limit of outward movement, the rod 40 and tubular shaft 42 extending radially of the shaft 18 and at an angle slightly below the horizontal, it being noted that the tubular shaft 27 extends substantially in a vertical direction. A head 47 is carried by the outer end of the tubular shaft 42 and is provided with a substantially V-shaped outer end defining walls 48 and 49 to be extended through the edge notches 13 of the flange 11 of the drum with side shoulders 50 engaged with the inner face of the flange 11 to limit projection of the head 47 outwardly of the flange 11 as shown in Figures 4 and 8.

Figure 12:
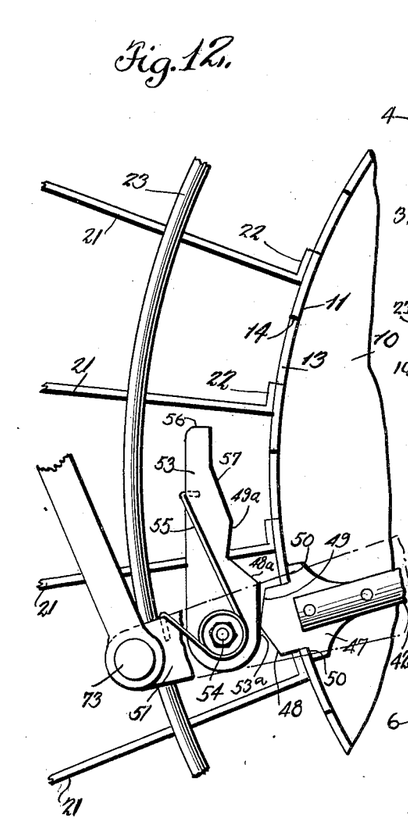
Figure 12 is a fragmentary elevational view of the tensioned drum rotating dog showing escapement position thereof in passing over the end of the movement restraining means for the drum during retracted movement to set position.

The rotating means for the bottle conveying drum includes an arm 51 pivotally supported at one end as at 52 upon the shaft 18, the arm 51 being positioned laterally of the open side of the drum and having a dog 53 pivotally mounted thereon as at 54 to work over the peripheral edge of the drum or flange 11, the spring 55 associated with the dog 53 and arm 51 normally influencing the free end of the dog toward the flange 11. The detail construction of the dog 53 is shown in Figure 12, the free end of the dog having an end abutment nose 56 normally projecting into a notch 13 of the drum flange and spaced from the far edge wall thereof with an adjacent flat surface 57 resting upon the flange 11 of the drum. The face of the dog adjacent the drum and inwardly of the flat face 57 is provided with a V-shaped notch defining abutment faces 48a and 49a for engagement with the faces 48 and 49 upon the head 47 carried by the tubular shaft 42 as shown in Figure 4, the operation of the arm 51 and dog 53 being dependent upon the coin controlled operating mechanism described in co-pending application hereinbefore referred to, the operating mechanism independent of the coin control devices being more clearly shown in Figures 4 and 8.

A pair of segment plates 58 and 59 superposed upon each other are pivotally supported on the shaft 60 mounted upon a side wall of the casing, the segment plate 58 having an arcuate slot 61 therein adjacent its outer edge through which a pin 62 carried by the segment plate 59 extends. A finger extension 63 on the upper corner edge of the segment plate 58 is engaged by a pin 64 carried by the operating plunger rod 65 extending through the front wall 1 of the casing, as illustrated. An arm 66 carried by the lever plate 36 has one end of a coil spring 67 attached thereto as at 68 while the other end of the coil spring is attached as at 69 to the lower edge of the segment plate 58. A link rod 70 is attached at one end as at 71 to an arm 72 extending outwardly of the free edge of the segment plate 59 while its other end is pivotally attached as at 73 to the free end of the arm 51.

The front wall 1 of the casing is provided with coin deposit openings 74, one associated with each drum while a handle 75 is attached to the outer end of each operating rod 65, the front wall of the casing being also provided with coin inspection openings 76 while the top wall 4 of the casing is provided with bottle delivery openings 77 closed by hinged covers 78 shown in Figures 2 and 6, the bottle delivery openings 77 being aligned with the pockets 26 in the drum.

The normal position of the different parts of the mechanism is shown in Figure 4, with one of the cam lugs 25 upon the arm 21 engaged with the cam lever 39 upon the lever plate 36 for holding the free end of the lever 34 substantially at its limit of upward movement with the plunger rod 28 projected into a pocket 26. The head 47 upon the tubular shaft 42 is projected into a notch 13 in the free edge of the flange 11 of the drum and the V-shaped notch comprising the angle walls 48a and 49a of the dog 53 is engaged with the abutment faces 48a and 49a respectively upon the head 47 of the tubular shaft 42. Upon the deposit of a coin in one of the slots 76 as described in the co-pending application hereinbefore mentioned, the operating rod 65 is withdrawn from the casing in the direction of the arrow shown in Figure 4, the pin 64 upon the rod 65 being engaged with the finger 63 to move the segment plate 58 with lost motion, the distance of the slot 61 therein over the pin 62, placing the spring 67 under tension, a continued pull upon the rod 65 then causing movement of the segment plate 59, link 70 and arm 51, together with the dog 53 carried by the arm 51. In the normal position of the dog 53, as shown in Figure 4, the abutment end 56 thereof is spaced from the distant edge wall 14 of the notch 13 and the angle wall 48a of the dog engaged with the angle wall 48 of the head 47 carried by the tubular rod 42 causes longitudinal movement of the tubular shaft 42 upon the rod 40 against the tension of the spring 45 to displace the head 47 from the associated notch in the flange 11 of the drum, the flat face 57 upon the dog during this movement riding over the periphery of the flange 11. By the time that the forward abutment end 56 of the dog 53 reaches the distant edge wall 14 of the notch 13, the head 47 is completely removed from the notch 13 and said dog then begins to rotate the bottle conveying drum. The initial rotating movement of the drum causes the cam lug 25 that is engaged with the cam lever 39 to be disengaged therefrom, only a slight movement being required, the spring 67 then moving the lever plate 36 and arm 34 upon the pivot pin 33 for causing the plunger rod 28 to be withdrawn into the tubular shaft 27 and out of the flange slotted opening 12, the plunger rod 28 and cam lever 39 then assuming the positions shown in Figure 8. The openings 12 are of sizes to permit limited rotary movements of the drums with the plunger rod 28 extending therethrough so that the drums may be rotated limited distances during projection and retraction of the plunger rod 28. A further pull upon the operating rod 65 causes further rotation of the drum to bring the next succeeding opening 12 into registration with the tubular shaft 27 and plunger rod 28, during which movement, the next succeeding cam lug 25 upon an arm 21 moving a distance before engaging the cam lever 39 and when engaged with the lever 39, the same is elevated together with the arm 34 to cause the plunger rod 28 to be moved through the next succeeding opening 12 for the ejection of a bottle B as shown in Figure 6 through the delivery opening 77 in the top wall 4 of the casing, the bottle partially opening the cover 78. At this time, the operating rod 65 has reached its limit of outward movement and the next succeeding cam lug 25 retains the cam lever 39 elevated in the position shown in Figure 4, with the lever 34 raised and the plunger rod 28 remains in an extended position. With the drum locking head 47 retracted from a notch 13, the outer end of the head rides upon the inner face of the flange 11 until the next succeeding notch is caused to register with the head and at which time said head is spring projected into the notch for retaining the drum against rotation, movement of the head into the notch occurring at the time immediately following the projection of the plunger rod 28 for the ejection or delivery of the bottle. When the plunger rod 65 is projected into the casing, the spring 67 shifts the segment plates 58 and 59, causing lowering movement of the link 70 and the arm 51 with the dog 53 carried by the arm, the lever 34 remaining in its raised position with the plunger rod 24 projected and so retained by the cam lug 25 upon an arm 21 engaged with the cam lever 39. During retrograde movement of the dog 53, the abutment end 56 thereof is removed from a flange notch 13, the inner edge face 53a of the dog 53 riding over the V-shaped nose of the head 47, assuming the position shown in Figure 12 permitting an escapement movement of the dog past the head 47, such movement of the dog continuing until the V-shaped notch in the inner face of the dog defining the angle faces 48a and 49a are aligned with the angle faces 48 and 49 upon the head 47, the spring 55 associated with the dog then moving the latter into engagement with the head 47 to assume the position shown in Figure 4.

From the above detailed description of the invention, it is believed that the construction and operation thereof will at once be apparent, it being noted that the drums are selectively operated and rotate in a step by step movement with each drum positively locked in bottle delivery position and in the event of failure to remove a bottle, partially projected through a delivery opening 77, the bottle will descend or return to the pocket 26 upon retraction of the plunger rod 28, thus preventing jamming of the apparatus and eliminating injury thereto.

While there is herein shown and described the preferred embodiment of the present invention, it is nevertheless to be understood that minor changes may be made therein without departing from the spirit and scope of the invention as claimed.

I claim:—

1. In dispensing apparatus of the character described, a rotatable article conveying drum, means for rotating the drum, means for ejecting an article therefrom, and means for holding the drum stationary when the article ejecting means is being retracted into set position and adapted to be moved to an inoperative position by a part of the rotating means when the latter is operated.

2. In dispensing apparatus of the character described, a rotatable article conveying drum, means for rotating the drum, means for ejecting an article therefrom, and means for holding the drum stationary when the article ejecting means is being retracted into set position and adapted to be engaged by the part of the drum rotating means that directly engages the drum to be moved to an inoperative position when the drum rotating means is operated, the operation of the article ejecting means being effected at the end of each step by step rotative movement of the drum.

3. In dispensing apparatus of the character described, a rotatable article conveying drum, means for rotating the drum, means for ejecting an article therefrom, and means for holding the drum stationary when the article ejecting means is being retracted into set position and adapted to be engaged by the part of the drum rotating means that directly engages the drum to be moved to an inoperative position when the drum rotating means is operated, the article ejecting means being operated by the drum at the limit of each step by step rotative movement of the drum.

4. In dispensing apparatus of the character described, a rotatable article conveying drum, means for rotating the drum, means for ejecting an article therefrom, and means for holding the drum stationary when the article ejecting means is being retracted into set position, the drum rotating means including a dog initially operating to render the drum holding means inoperative and thereafter having ratchet engagement with the drum.

5. In dispensing apparatus of the character described, a rotatable article conveying drum, means for rotating the drum, means for ejecting an article therefrom, and means for holding the drum stationary when the article ejecting means is being retracted into set position, the drum rotating means including a dog initially operating to render the drum holding means inoperative and thereafter having ratchet engagement with the drum for rotating the drum in a step by step movement.

6. In dispensing apparatus of the character described, a rotatable article conveying drum, means for rotating the drum, means for ejecting an article therefrom, means for holding the drum stationary when the article ejecting means is being retracted into set position, the means for holding the drum stationary including a tensioned plunger rod, and said drum having spaced notches in the peripheral wall thereof into which the tensioned plunger is successively projected and the drum rotating means when operated initially shifting the drum holding means to inoperative position and thereafter rotating the drum.

7. In dispensing apparatus of the character described, a rotatable article conveying drum, means for rotating the drum, means for ejecting an article therefrom, and means for holding the drum stationary when the article ejecting means is being retracted into set position, the drum rotating means including a dog having ratchet engagement with the drum, the means for holding the drum stationary including a tensioned plunger rod and said drum having spaced notches in the peripheral wall thereof into which the tensioned plunger is successively projected, the drum rotating dog being engageable with the tensioned plunger during progressive movement of the dog for disengaging the plunger from the drum.

8. In dispensing apparatus of the character described, a rotatable article conveying drum, means for rotating the drum, means for ejecting an article therefrom, means for holding the drum stationary when the article ejecting means is being retracted into set position, the drum rotating means including a dog having ratchet engagement with the drum for rotating the drum in a step by step movement, the means for holding the drum stationary including a tensioned plunger rod, and said drum having spaced notches in the peripheral wall thereof into which the tensioned plunger is successively projected, the drum rotating dog being engageable with the tensioned plunger during progressive movement of the dog for disengaging the plunger from the drum.

9. In dispensing apparatus of the character described, wherein coin controlled devices permit operation of the apparatus, a refrigerant casing, a plurality of bottle conveying drums independently rotatable therein, means extending exteriorly of the casing for the operation of the drums, a bottle delivery opening in the casing for each drum, each drum including an annular flange having spaced openings therein, and a radial partition wall at opposite sides of each opening defining bottle pockets, a plunger movable radially of the drum and through a flange opening to eject a bottle therefrom toward the delivery opening in the casing, the operating means for the plunger including a pivoted lever attached to the plunger, and a cam arm extension on the lever and cam lugs on the pocket partitions for operating the cam arm and lever.

10. In dispensing apparatus of the character described, wherein coin controlled devices permit operation of the apparatus, a refrigerant casing, a plurality of bottle conveying drums independently rotatable therein, means extending exteriorly of the casing for the operation of the drums, a bottle delivery opening in the casing for each drum, each drum including an annular flange having spaced openings therein, and a radial partition wall at opposite sides of each opening defining bottle pockets, a plunger movable radially of the drum and through a flange opening to eject a bottle therefrom toward the delivery opening in the casing, the operating means for the plunger including a pivoted lever attached to the plunger, and a cam arm extension on the lever and cam lugs on the pocket partitions for operating the cam arm and lever, the drum rotating means including a pivoted arm, a ratchet dog carried thereby and the drum flange having spaced notches therein with the dog engageable with the walls of the notches.

11. In dispensing apparatus of the character described, wherein coin controlled devices permit operation of the apparatus, a refrigerant casing, a plurality of bottle conveying drums independently rotatable therein, means extending exteriorly of the casing for the operation of the drums, a bottle delivery opening in the casing for each drum, each drum including an annular flange having spaced openings therein, a radial partition wall at opposite sides of each opening defining bottle pockets, a plunger movable radially of the drum and through a flange opening to eject a bottle therefrom toward the delivery opening in the casing, the operating means for the plunger including a pivoted lever attached to the plunger, a cam arm extension on the lever and cam lugs on the pocket partitions for operating the cam arm and lever, and a tensioned plunger engageable with the drum for holding the drum stationary during radial retraction of the bottle ejecting plunger.

12. In dispensing apparatus of the character described, wherein coin controlled devices permit operation of the apparatus, a refrigerant casing, a plurality of bottle conveying drums independently rotatable therein, means extending exteriorly of the casing for the operation of the drums, a bottle delivery opening in the casing for each drum, each drum including an annular flange having spaced openings therein, a radial partition wall at opposite sides of each opening defining bottle pockets, a plunger movable radially of the drum and through a flange opening to eject a bottle therefrom toward the delivery opening in the casing, the drum rotating means including a pivoted arm, a ratchet dog carried thereby and the drum flange having spaced notches therein with the dog engageable with the walls of the notches, and a tensioned plunger successively engageable in the flange notches for holding the drum against rotation during retraction of the bottle ejecting rod, the dog in its forward and backward paths of movement traversing the outer projecting end of the tensioned plunger, the dog being spring pressed and riding over the plunger during retrograde movement, and being positively engaged with the plunger during forward movement for disengaging the tensioned plunger from the drum flange notch to permit rotation of the drum.

13. In dispensing apparatus of the character described, wherein coin controlled devices permit operation of the apparatus, a refrigerant casing, a plurality of bottle conveying drums independently rotatable therein, means extending exteriorly of the casing for the operation of the drums, a bottle delivery opening in the casing for each drum, each drum including an annular flange having spaced openings therein, a radial partition wall at opposite sides of each opening defining bottle pockets, a plunger movable radially of the drum and through a flange opening to eject a bottle therefrom toward the delivery opening in the casing, the operating means for the plunger including a pivoted lever attached to the plunger, a cam arm extension on the lever and cam lugs on the pocket rotating means including a pivoted arm, a ratchet dog carried thereby and the drum flange having spaced notches therein with the dog engageable with the walls of the notches, and a tensioned plunger successively engageable in the flange notches for holding the drum against rotation during retraction of the bottle ejecting rod, the dog in its forward and backward paths of movement traversing the outer projecting end of the tensioned plunger, the dog being spring pressed and riding over the plunger during retrograde movement, and being positively engaged with the plunger during forward movement for disengaging the tensioned plunger from the drum flange notch to permit rotation of the drum.

14. In dispensing apparatus of the character described, a rotatable article conveying drum, means for rotating the drum, reciprocating means normally located adjacent the center of the drum for ejecting an article from the drum and means within the drum for holding the drum stationary, and manually operated devices having a spring connection with the article ejecting means and a link connection with the drum rotating means whereby the drum rotating means operates in advance of the article ejecting means and said drum holding means being disengaged from the drum during initial operating movement of the drum rotating means and before the latter becomes effective for rotating the drum.

15. In dispensing apparatus of the character described, a rotatable article conveying drum, means for rotating the drum, reciprocating means normally located adjacent the center of the drum for ejecting an article from the drum and means within the drum for holding the drum stationary, manually operated devices having a spring connection with the article ejecting means and a link connection with the drum rotating means whereby the drum rotating means operates in advance of the article ejecting means and said drum holding means being disengaged from the drum during initial movement of the drum rotating means and before the latter becomes effective for rotating the drum, and a slip cam connection between the article ejecting means and drum operating to retract and project the article ejecting means during rotation of the drum.

16. In dispensing apparatus of the character described, a rotatable article conveying drum, means for rotating the drum, reciprocating means normally located adjacent the center of the drum for ejecting an article from the drum and means within the drum for holding the drum stationary, and manually operated devices having a spring connection with the article ejecting means and a link connection with the drum rotating means whereby the drum rotating means operates in advance of the article ejecting means and said drum holding means being disengaged from the drum during initial operating movement of the drum rotating means and before the latter becomes effective for rotating the drum, the drum holding means including a tensioned plunger successively engaged with the drum and disengaged from the drum by the drum rotating means during initial operation of the latter.

17. In dispensing apparatus of the character described, a rotatable article conveying drum, means for rotating the drum, reciprocating means normally located adjacent the center of the drum for ejecting an article from the drum and means within the drum for holding the drum stationary, and manually operated devices having a spring connection with the article ejecting means and a link connection with the drum rotating means whereby the drum rotating means operates in advance of the article ejecting means and said drum holding means being disengaged from the drum during initial movement of the drum rotating means and before the latter becomes effective for rotating the drum, and a slip cam connection between the article ejecting means and drum operating to retract and project the article ejecting means during rotation of the drum, the drum holding means including a tensioned plunger successively engaged with the drum and disengaged from the drum by the drum rotating means during initial operation of the latter.

18. In dispensing apparatus of the character described, a rotatable article conveying drum, means for rotating the drum, reciprocating means normally located adjacent the center of the drum for ejecting an article from the drum and means within the drum for holding the drum stationary, and manually operated devices having a spring connection with the article ejecting means and a link connection with the drum rotating means whereby the drum rotating means operates in advance of the article ejecting means and said drum holding means being disengaged from the drum during initial operating movement of the drum rotating means and before the latter becomes effective for rotating the drum, the drum holding means including a tensioned plunger successively engaged with the drum and disengaged from the drum by the drum rotating means during initial operation of the latter, the drum rotating means including a tensioned dog escaping the tensioned plunger during retrograde movement and operating to disengage the plunger from the drum during initial forward movement thereof.

19. In dispensing apparatus of the character described, a rotatable article conveying drum, means for rotating the drum, reciprocating means normally located adjacent the center of the drum for ejecting an article from the drum and means within the drum for holding the drum stationary, and manually operated devices having a spring connection with the article ejecting means and a link connection with the drum rotating means whereby the drum rotating means operates in advance of the article ejecting means and said drum holding means being disengaged from the drum during initial movement of the drum rotating means and before the latter becomes effective for rotating the drum, and a slip cam connection between the article ejecting means and drum operating to retract and project the article ejecting means during rotation of the drum, the drum holding means including a tensioned plunger successively engaged with the drum and disengaged from the drum by the drum rotating means during initial operation of the latter, the drum rotating means including a tensioned dog escaping the tensioned plunger during retrograde movement and operating to disengage the plunger from the drum during initial forward movement thereof.

20. In dispensing apparatus of the character described, a rotatable article conveying drum, means for rotating the drum, reciprocating means normally located adjacent the center of the drum for ejecting an article from the drum and means within the drum for holding the drum stationary, and manually operated devices having a spring connection with the article ejecting means and a link connection with the drum rotating means whereby the drum rotating means operates in advance of the article ejecting means and said drum holding means being disengaged from the drum during initial forward operating movement of the drum rotating means, said article ejecting means reaching its full length of movement when the drum holding means becomes effective.

21. In dispensing apparatus of the character described, a rotatable article conveying drum, means for rotating the drum, reciprocating means normally located adjacent the center of the drum for ejecting an article from the drum and means within the drum for holding the drum stationary, manually operated devices having a spring connection with the article ejecting means and a link connection with the drum rotating means whereby the drum rotating means operates in advance of the article ejecting means and said drum holding means being disengaged from the drum during initial forward movement of the drum rotating means, and a slip cam connection between the article ejecting means and drum operating to retract and project the article ejecting means during rocam connection between the article ejecting means reaching its full length of movement when the drum holding means becomes effective.

In testimony whereof I affix my signature.

JOHN A. HELLER.